(12) United States Patent
Oh

(10) Patent No.: US 9,961,242 B2
(45) Date of Patent: May 1, 2018

(54) STEREO CAMERA

(71) Applicant: LG Electronics Inc., Seoul (KR)

(72) Inventor: Jaeheon Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 14/830,416

(22) Filed: Aug. 19, 2015

(65) Prior Publication Data

US 2016/0227078 A1 Aug. 4, 2016

(30) Foreign Application Priority Data

Feb. 4, 2015 (KR) ........................ 10-2015-0017640

(51) Int. Cl.
*B60R 11/04* (2006.01)
*H04N 5/225* (2006.01)
(Continued)

(52) U.S. Cl.
CPC ........... *H04N 5/2252* (2013.01); *B60R 11/04* (2013.01); *G03B 17/02* (2013.01); *G03B 17/55* (2013.01);
(Continued)

(58) Field of Classification Search
CPC .... B60R 2001/1223; B60R 2001/1253; B60R 1/00; B60R 11/04; B60R 1/04;
(Continued)

(56) References Cited

U.S. PATENT DOCUMENTS 6,811,330 B1 * 11/2004 Tozawa ................... B60R 11/04
224/321
2004/0208497 A1 10/2004 Seger et al.
(Continued)

FOREIGN PATENT DOCUMENTS

CN 203419087 U * 2/2014
DE 10 2013 200 966 A1 8/2013
(Continued)

OTHER PUBLICATIONS

DM385 and DM388 DaVinci™ Digital Media Processor, Texas Instruments, Dec. 2013, pp. 234-235.*
(Continued)

*Primary Examiner* — Dave Czekaj
*Assistant Examiner* — Alison Slater
(74) *Attorney, Agent, or Firm* — Birch, Stewart, Kolasch & Birch, LLP

(57) ABSTRACT

A stereo camera includes a base assembly capable of being commonly used regardless of type of vehicle, the base assembly including a first lens, a first image sensor for capturing a first image on the basis of incident light introduced through the first lens, a second lens, and a second image sensor for capturing a second image on the basis of incident light introduced through the second lens, a processor for processing the first image and the second image. A windshield bracket is provided including an attachment part adapted to windshields having different inclination angles and radii of curvature and attached thereto. A mount part holds the base assembly so as to enable the first image sensor and the second image sensor to capture forward images of a vehicle.

17 Claims, 13 Drawing Sheets

(51) Int. Cl.
*G03B 17/02* (2006.01)
*G03B 17/55* (2006.01)
*G03B 35/08* (2006.01)
*H04N 5/372* (2011.01)
*H04N 5/374* (2011.01)
*B60R 11/00* (2006.01)

(52) U.S. Cl.
CPC ............ *G03B 35/08* (2013.01); *H04N 5/372* (2013.01); *H04N 5/374* (2013.01); *B60R 2011/0026* (2013.01)

(58) Field of Classification Search
CPC ... B60R 2011/0026; B60R 11/00; H04N 7/18; H04N 2013/0081; H04N 5/2253; H04N 7/142; H04N 5/2254; H04N 13/0239; H04N 5/2252
See application file for complete search history.

(56) References Cited

U.S. PATENT DOCUMENTS

| | | |
|---|---|---|
| 2009/0169052 A1 | 7/2009 | Seki et al. |
| 2009/0268013 A1 | 10/2009 | Katahira et al. |
| 2012/0207461 A1 | 8/2012 | Okuda |
| 2013/0222091 A1* | 8/2013 | Fullerton .............. H01F 7/0257 335/295 |
| 2014/0247390 A1 | 9/2014 | Ohsumi |
| 2015/0146094 A1 | 5/2015 | Seger et al. |

FOREIGN PATENT DOCUMENTS

| | | | |
|---|---|---|---|
| DE | 102012204192 A1 * | 9/2013 | .............. B60R 11/04 |
| EP | 1 086 859 A1 | 3/2001 | |
| EP | 2 407 350 A2 | 1/2012 | |
| EP | 2 665 249 A1 | 11/2013 | |
| GB | 2469738 A | 8/2013 | |
| JP | 2008-195229 A | 8/2008 | |
| JP | 2008-244938 A | 10/2008 | |
| JP | 2009-265412 A | 11/2009 | |
| JP | 2012-76691 A | 4/2012 | |
| JP | 2012-166615 A | 9/2012 | |
| KR | 10-2011-0001709 A | 1/2011 | |
| KR | 10-2012-0051677 A | 5/2012 | |
| KR | 10-2014-0048530 A | 4/2014 | |
| KR | 10-2014-0119189 A | 10/2014 | |
| WO | WO 2013/123161 A1 | 8/2013 | |

OTHER PUBLICATIONS

Agarwal et al., "Get Smart" with TI's embedded analytics technology, Texas Instruments White Paper, 2012, p. 9.*
CN203419087U English translation.*

* cited by examiner

STEREO CAMERA

CROSS-REFERENCE TO RELATED APPLICATION

This application claims the priority benefit of Korean Patent Application No. 10-2015-0017640, filed on Feb. 4, 2015 in the Korean Intellectual Property Office, the disclosure of which is incorporated herein by reference.

BACKGROUND OF THE INVENTION

1. Field of the Invention

The present invention relates to a stereo camera, and more particularly, to a stereo camera installed in a vehicle.

2. Description of the Related Art

Recently, with increasing interest in autonomous vehicles, research on sensors mounted in such autonomous vehicles is being actively made. As examples of the sensors mounted in autonomous vehicles, there are cameras, infrared sensors, radars, GPS devices, lidars, gyroscopes and the like. Among these, the camera is a sensor functioning as an eye and thus is a critical component.

Meanwhile, a stereo camera, which is one type of camera mounted in a vehicle, may be utilized to detect a distance to an obstacle using a disparity map. Such a stereo camera includes a plurality of components as well as two cameras, and thus requires a space for accommodating the components. Furthermore, owing to heat generated from the plurality of components, there may be problems in image processing in the stereo camera. Accordingly, research and development on a space for accommodating components of the camera and research and development on a heat dissipation technology are desperately needed.

Generally, a stereo camera is mounted on a windshield of a vehicle having an inclination angle and a radius of curvature which differ depending on the type of the vehicle. Hence, there is a problem in that the stereo camera has to be manufactured in accordance with the type of vehicle. Furthermore, when stereo cameras are mass produced in accordance with the types of vehicles, a production line and a production process have to be changed depending on the type of vehicle, thus causing an increase in manufacturing costs such as capital investment.

SUMMARY OF THE INVENTION

Therefore, the present invention has been made in view of the above problems, and it is an object of the present invention to provide a stereo camera capable of being commonly used regardless of the type of vehicle.

In accordance with an aspect of the present invention, the above and other objects can be accomplished by the provision of a stereo camera including a base assembly capable of being commonly used regardless of the type of vehicle, the base assembly comprising a first lens, a first image sensor for capturing a first image on the basis of incident light introduced through the first lens, a second lens, and a second image sensor for capturing a second image on the basis of incident light introduced through the second lens, a processor for processing the first and second images, and a windshield bracket comprising an attachment part adapted to windshields having different inclination angles and radii of curvature and attached thereto, and a mount part for holding the base assembly so as to enable the first and second image sensors to capture forward images of a vehicle.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated. In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

Terms such as "includes" or "has" used herein should be considered as indicating the presence of several components, functions or steps, disclosed in the specification, and it is also understood that more or fewer components, functions, or steps may likewise be utilized.

Figure 1:
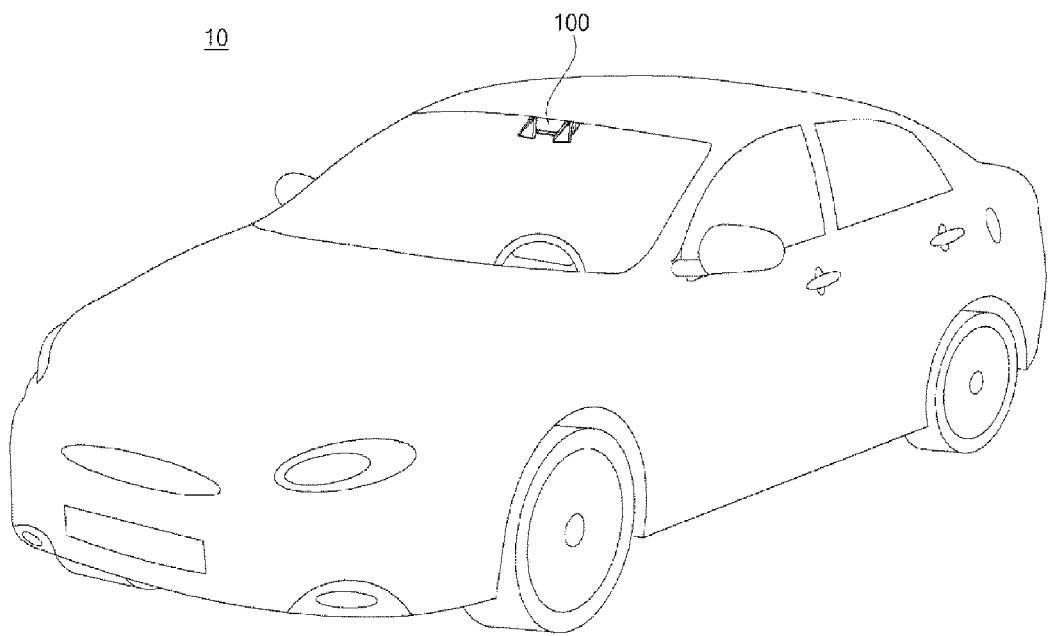
FIG. 1 is a view illustrating an external appearance of a vehicle which is provided with a stereo camera according to an embodiment of the present invention.
Figure 2:
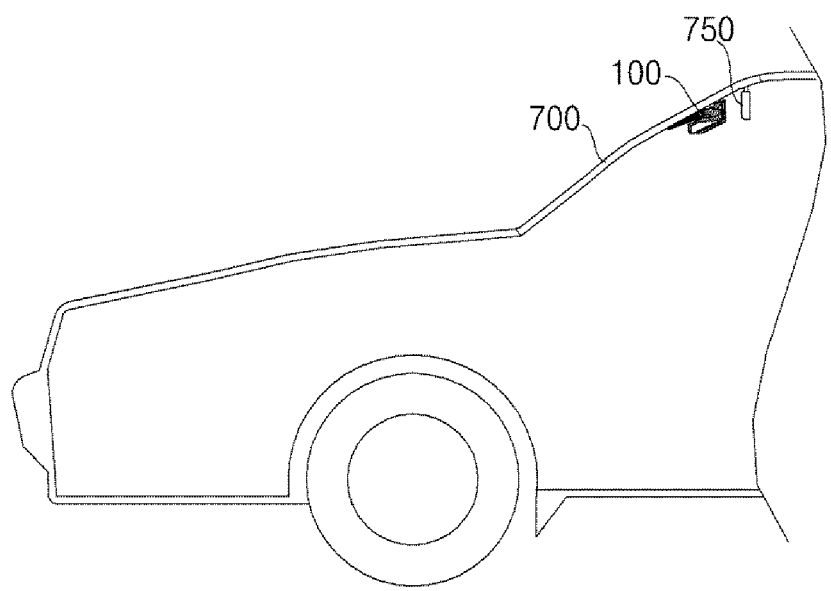
FIG. 2 is a side view illustrating the vehicle which is provided with the stereo camera according to the embodiment of the present invention.

FIG. 1 is a view illustrating an external appearance of a vehicle which is provided with a stereo camera according to an embodiment of the present invention. FIG. 2 is a side view illustrating the vehicle which is provided with the stereo camera according to the embodiment of the present invention.

Referring to FIGS. 1 and 2, the vehicle 10 may be considered as including an internal combustion vehicle equipped with an internal combustion engine, a hybrid vehicle equipped with both an internal combustion engine and an electric motor, and an electric vehicle equipped with an electric motor.

The vehicle 10 includes various sensors. For example, the vehicle 10 may include at least one of an illuminance sensor, an acceleration sensor, a gravity sensor, a gyroscopic sensor, a motion sensor, an ultraviolet sensor, an ultrasonic sensor, an optical sensor, a microphone, a battery gauge, and an environmental sensor (for example, a barometer, a hygrometer, a thermometer, a thermal sensor and a gas sensor). The vehicle 10 disclosed in this specification may combine and utilize information detected by at least two sensors among the above mentioned various sensors.

As one of the various sensors, the vehicle 10 may include a stereo camera 100 for obtaining images around the vehicle. Although the stereo camera 100 is preferably provided in the interior of the vehicle, an installation position of the stereo camera 100 is not limited thereto. The stereo camera 100 may be disposed between a windshield 700 and an interior rearview mirror 750. The stereo camera 100 may be attached to the windshield 700, and may be positioned in the interior of the vehicle such that lenses thereof face toward the front of the vehicle.

Figure 3:
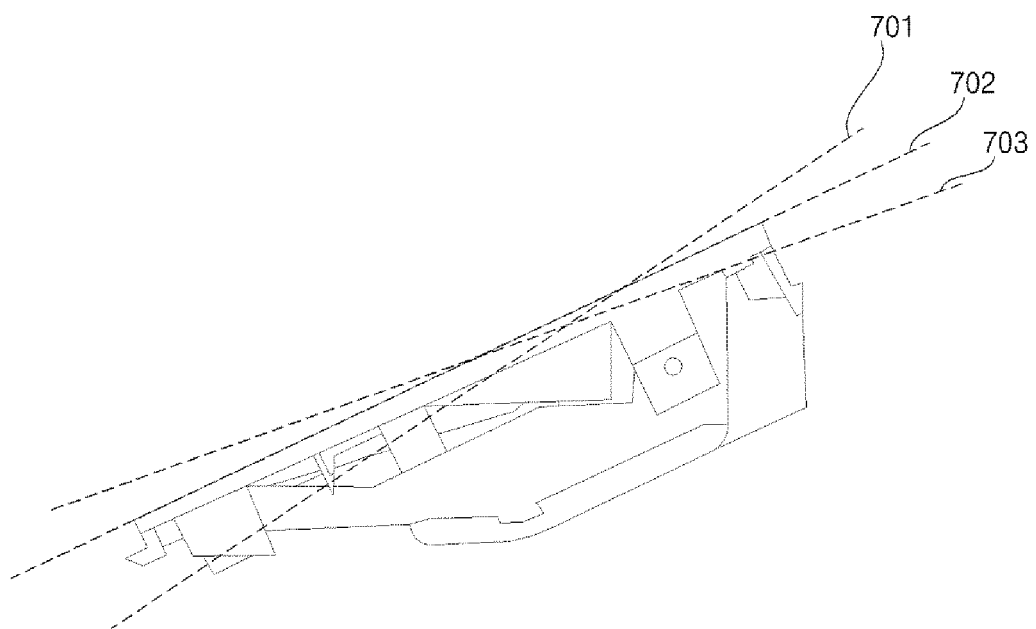
FIG. 3 is a view illustrating various windshields having different inclination angles depending on the type of vehicle.

FIG. 3 is view illustrating various windshields having different inclination angles depending on the type of vehicle.

The windshield 700 provided in a vehicle 10 has an inclination angle and a radius of curvature which differ depending on the type of the vehicle. Specifically, the windshield 700 of the vehicle 10 generally extends from a hood to a roof of the vehicle 10 while being inclined with respect to the ground surface by a predetermined angle. Here, a windshield 701 of a sport utility vehicle (SUV) or a recreational vehicle (RV) has a higher inclination angle than that of a windshield 702 of a sedan because the SUV or the RV has a relatively high vehicle height and thus a relatively high driver seat height, compared to other types of vehicles. In other words, an angle defined between the windshield 701 and the ground surface is higher than that defined between the windshield 702 of the sedan and the ground surface.

Meanwhile, a sports car is constructed to minimize wind resistance for the purpose of an increase in speed. A windshield 703 of a sports car has a lower inclination angle than the windshield 702 of the sedan in order to reduce the wind resistance. In other words, an angle defined between the windshield 703 and the ground surface is lower than that defined between the windshield 702 of the sedan and the ground surface.

Furthermore, the windshield 702 of the sedan may have different inclination angles depending on the design of the sedan even though the sedans are of the same type.

A radius of curvature of the windshield in a horizontal direction or in a vertical direction differs depending on whether or not the vehicle is an SUV, an RV, a sedan or a sports car and differs depending on a design of the vehicle. As described above, the windshields 701, 702 and 703 have different inclination angles and radii of curvature in accordance with the types of the vehicles. Therefore, there is a problem in that the stereo cameras 100 attached to the windshields 701, 702 or 703 have to be manufactured in accordance with the types of vehicles.

The stereo camera 100 according to the present invention is composed of a plurality of modules. Among the plurality of modules, a base assembly including main components may be commonly used regardless of the type of vehicle in order to reduce manufacturing costs.

Figure 4:
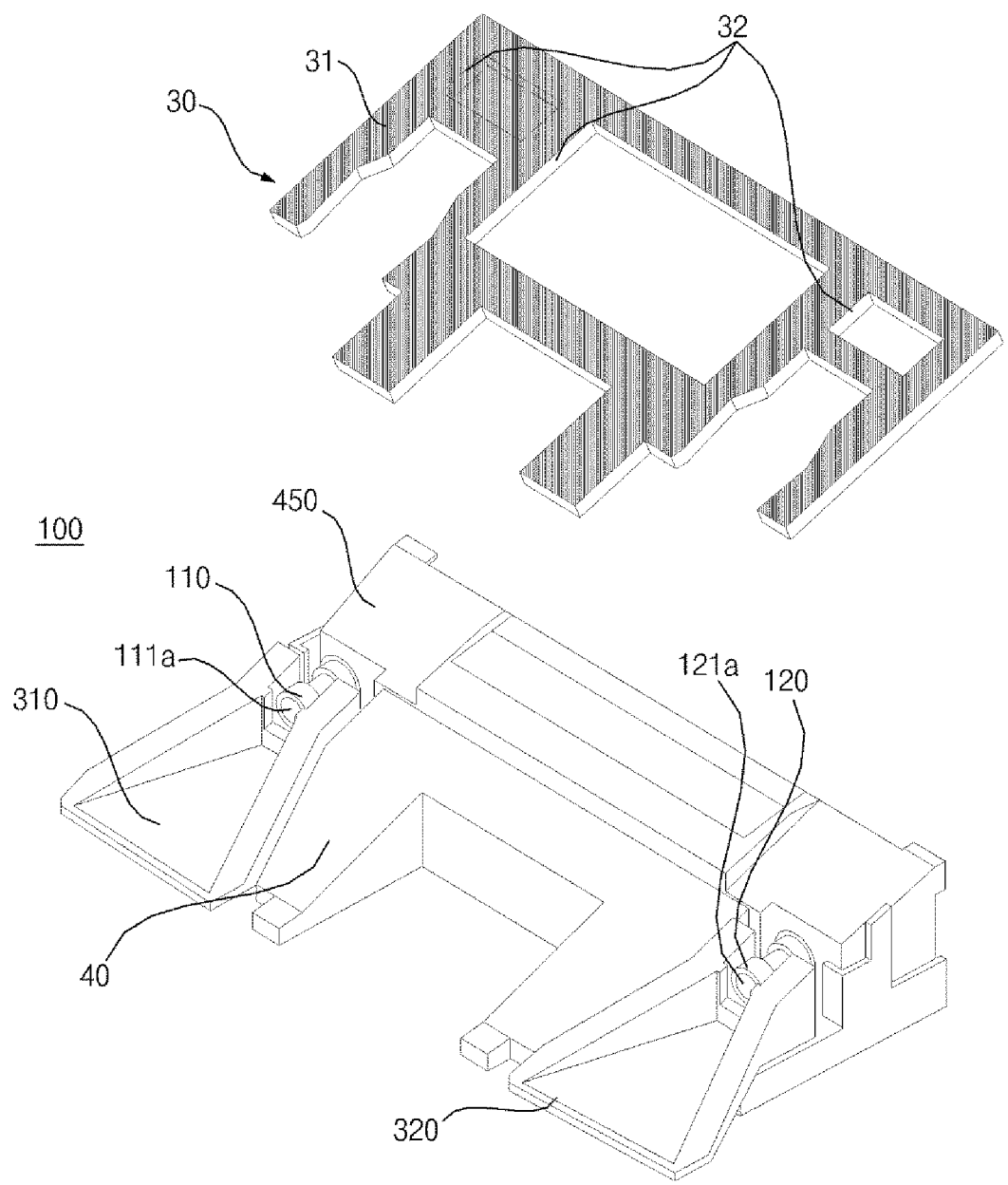
FIG. 4 is a perspective view of the stereo camera according to an embodiment of the present invention.
Figure 5:
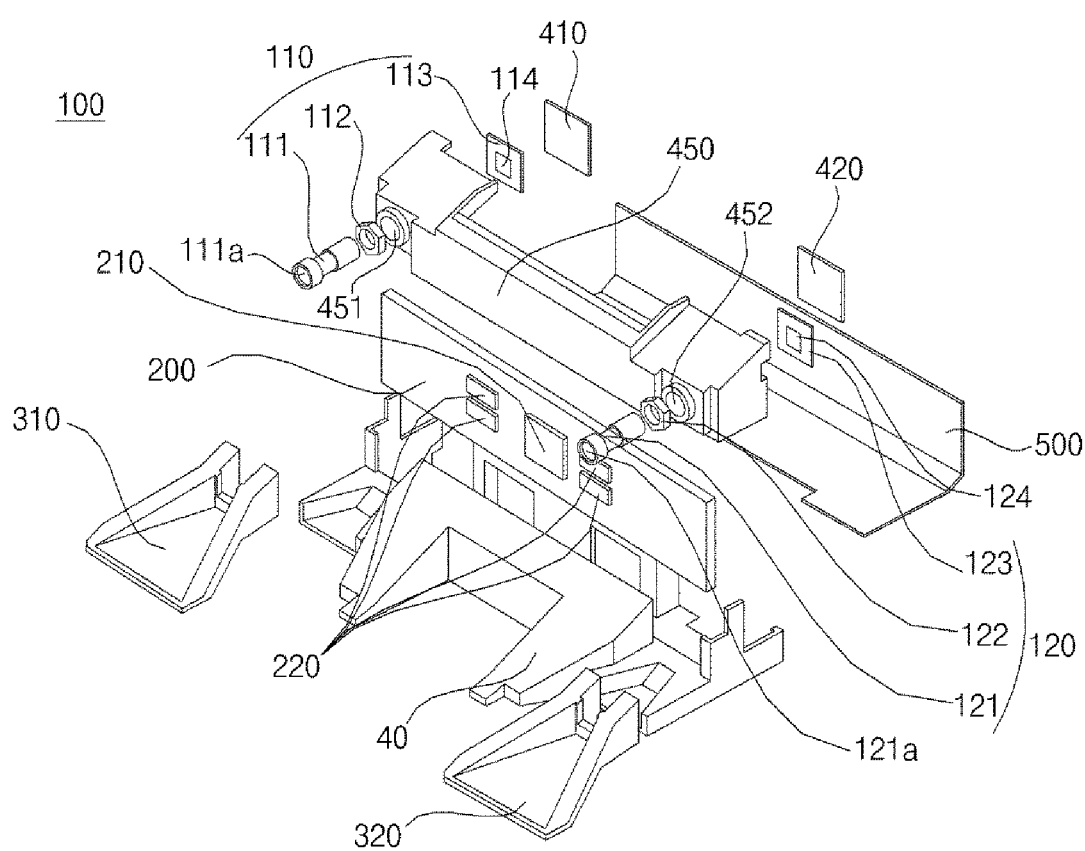
FIG. 5 is an exploded perspective view of the stereo camera according to the embodiment of the present invention.

FIG. 4 is a perspective view of the stereo camera according to an embodiment of the present invention. FIG. 5 is an exploded perspective view of the stereo camera according to the embodiment of the present invention.

Referring to FIGS. 4 and 5, the stereo camera 100 may include a windshield bracket 30, a first image capture module 110, a second image capture module 120, a processor board 200, a first light shield 310, a second light shield 320, a first radiating member 410, a second radiating member 420, a first housing 450, a second housing 500, and a holder 40.

The windshield bracket 30 includes an attachment part 31 and a mount part 32.

The attachment part 31 is provided at an upper surface of the windshield bracket 30, and is attachable to an inner surface of the windshield 700 by an adhesive member. The attachment part 31 may enable the windshield bracket 30 to be securely fixed to the windshield 700. The attachment part 31 may be commonly used regardless of the type of vehicle. The attachment part 31 may be configured to be commonly adhered to the windshields 701, 702 and 703 (FIG. 3) having different inclination angles and radii of curvature. For example, the attachment part 31 may be made of a flexible material, and may be flexibly adapted to the inclination angle and the radius of curvature of the windshield and adhered thereto.

The mount part 32 may hold the base assembly 20 which will be described later. For example, the mount part 32 may hold the base assembly 20 in such a way that the mount part 32 is coupled to the holder 40 with the base assembly 20 disposed therebetween. More specifically, the mount part 32 is preferably configured to hold the base assembly 20 disposed perpendicular to a direction of travel of the vehicle in the state that first and second image sensors 114 and 124 are disposed to face forward of the vehicle.

The stereo camera 100 including the windshield bracket 30 will be described in more detail with reference to FIGS. 6 to 11.

The first image capture module 110 includes the first lens module 111 and a first image sensor board 113. The first lens module 111 may be fitted in a first hole 451 formed at a first housing 450 and then may be fastened thereto by a first nut 112.

The first lens module 111 may horizontally extend toward the front of the vehicle 10. The first lens 111a included in the first lens module 111 may be positioned perpendicularly to a direction of travel of the vehicle 10 so as to receive incident light from the outside.

The first image sensor board 113 may be a circuit board including a first image sensor 114. Alternatively, the first image sensor board 113 may be integrated with the first image sensor 114. The first image sensor 114 may detect information of an object and convert the information into an image signal. For example, the first image sensor 114 may be embodied as a charge-coupled device (CCD) or a complimentary metal-oxide semiconductor (CMOS).

The first image sensor 114 may be positioned in the interior of the vehicle close to the windshield 700 in order to capture a forward image of the vehicle. In other words, the first image sensor board 113 containing the first image sensor 114 may be connected to the first lens module 111 and may be disposed close to the windshield 700.

The first image sensor board 113 may be disposed behind the first lens module 111 in order to receive an image from the first lens module 111. Preferably, the first image sensor board 113 is spaced apart from the first lens module 111 by a predetermined distance and is positioned perpendicularly the direction of travel of the vehicle 10.

The first image capture module 110 containing the first image sensor 114 may be disposed close to an interior ceiling of the vehicle 10. For example, the first image capture module 110 may be attached to the interior ceiling of the vehicle 10 with a predetermined connecting member being disposed therebetween. Since the first image capture module 110 is disposed close to the interior ceiling of the vehicle 10, the first image capture module 110 may capture a forward image of the vehicle 10 at the highest position of the vehicle 10, thus assuring a wider forward field of view.

The second image capture module 120 includes the second lens module 121 and a second image sensor board 123. The second lens module 121 may be fitted in a second hole 452 formed at the first housing 450 by a second nut 122.

The second lens module 121 may horizontally extend toward the front of the vehicle. The second lens 121a included in the second lens module 121 may be positioned perpendicularly to the direction of travel of the vehicle 10 so as to receive incident light from the outside.

The second image sensor board 123 may be a circuit board including a second image sensor 124. Alternatively, the second image sensor board 123 may be integrated with the second image sensor 124. The second image sensor 124 may detect information of an object and convert the information into an image signal. For example, the second image sensor 124 may be embodied as a charge-coupled device (CCD) or a complimentary metal-oxide semiconductor (CMOS).

The second image sensor 124 may be positioned in the interior of the vehicle close to the windshield 700 in order to capture a forward image of the vehicle. In other words, the second image sensor board 123 containing the second image sensor 124 may be connected to the second lens module 121 and may be disposed close to the windshield 700.

The second image sensor board 123 may be disposed behind the second lens module 121 in order to receive an image from the second lens module 121. Preferably, the second image sensor board 123 is spaced apart from the second lens module 121 by a predetermined distance and is positioned perpendicularly to the direction of travel of the vehicle 10.

The second image capture module 120 containing the second image sensor 124 may be disposed close to an interior ceiling of the vehicle 10. For example, the second image capture module 120 may be attached to the interior ceiling of the vehicle 10 via a predetermined connecting member being disposed therebetween. Since the second image capture module 120 is disposed close to the interior ceiling of the vehicle 10, the second image capture module 120 may capture a forward image of the vehicle 10 at the highest position of the vehicle 10, thus assuring a wider forward field of view.

The first and second image sensors 114 and 124 are generally susceptible to heat. When heat is generated from the interior of the stereo camera 100, noise is correspondingly generated. The noise adversely influences signal processing, and thus problems may occur in performance of the first and second image sensors 114 and 124.

The first and second image sensors 114 and 124 may be symmetrically disposed on the same plane in the transverse direction. In other words, the second image sensor 124 may be disposed on the plane extending from the first image sensor 114. The first image sensor board 113 containing the first image sensor 114 and the second image sensor board 123 containing the second image sensor 124 may, of course, also be disposed on the same plane.

The processor board 200 is electrically connected to the first and second image sensor boards 113 and 123. The processor board 200 includes a processor 210 for processing images captured by the first and second image sensors 114 and 124. More specifically, the processor 210 may be embodied as a digital signal processor (DSP), an application specific integrated circuit (ASIC) or a microcontroller, and may be mounted on one side of the processor board 200.

The processor board 200 may be disposed at rear ends of the first and second sensor boards 113 and 123. The processor board 200 may be disposed at rear ends of the first and second image sensors 114 and 124. The processor board 200 may be disposed perpendicular to a direction of travel of the vehicle 10. The processor board 200 may be disposed perpendicular to a direction of travel of the vehicle 10 while one side of the processor board 200 faces toward the front of the vehicle 10.

Since the processor board 200 is disposed perpendicular to the direction of travel of the vehicle 10, the base assembly 20 may be configured to have a relatively small size.

Although not shown in the drawings, in some embodiments, the processor board 200 may be disposed such that a front or back surface thereof faces the windshield 700. For example, the processor board 200 may be disposed parallel to the windshield 700. Generally, the windshield 700 provided in the vehicle 10 extends from the hood to the roof of the vehicle 10 while being inclined by an inclination angle. Here, since the processor board 200 is installed such that the front or back surface thereof faces the windshield 700, the stereo camera assembly may be configured to have a smaller size than when the processor board 200 is vertically or horizontally disposed. The reduction in size of the stereo camera assembly may contribute to enlargement of the interior volume of the vehicle.

The processor board 200 may include a plurality of components. The plurality of components included in the processor board 200 may generate a larger amount of heat than the first and second image sensor boards 113 and 123.

The processor board 200 may be disposed spaced apart from the first and second image sensor boards 113 and 123. Since the processor board 200 is disposed spaced apart from the first and second image sensor boards 113 and 123, it is possible to prevent the heat generated from the processor board 200 from influencing performance of the first and second image sensors 114 and 124. In other words, the processor board 200 may be disposed at the optimal position such that the heat generated from the processor board 200 does not influence the first and second image sensors 114 and 124.

For example, the processor board 200 may be disposed below the first and second image sensor boards 113 and 123.

For example, the processor board 200 may be disposed between the first and second image sensor boards 113 and 123.

The processor 210 for processing images captured by the first image sensor 114 and the second image sensor 124 may be disposed at the center of the processor board 200. Generally, the processor 210 generates heat due to operation of various calculations. When the processor board 200 is disposed between the first and second image sensor boards 113 and 123, the processor 210 is positioned at the center of the processor board 200, and, as such, the heat generating element may be disposed at the farthest position from the first and second image sensors 114 and 124.

The processor board 200 may include at least one memory 220. The memory 220 stores images captured by the first and second image sensors 114 and 124 or data processed by the processor 210.

Similarly to the processor 210, the memory 220 is one of the principal heat generating elements. After the processor 210 is positioned at the center of the processor board 200, the memory 220 may be disposed around the processor 210. For example, the at least one memory 220 may be arranged close to the processor 210 so as to surround the processor 210. In this case, the processor 210 and the memory 220, which are the heat generating elements, may be disposed at the farthest positions from the first and second image sensors 114 and 124.

The processor 210 may be electrically connected to a vehicle control unit (for example, ECU). The processor 210 may exchange data with the vehicle control unit.

The first light shield 310 may be disposed in front of the first lens 111a included in the first image capture module 110. The first light shield 310 prevents light reflected from the inside the windshield 700 after passing through the windshield 700 and light generated from an unwanted external light source from entering the first lens 111a. The first light shield 310 is configured to have a partition shape to block unwanted light. Particularly, considering that the stereo camera 100 is attached to the windshield 700, a lower partition is preferably provided so as to reflect light reflected from the inside the windshield 700.

The first light shield 310 may have a shape varying in accordance with the type of vehicle. For example, since a radius of curvature of the windshield 700 or an angle defined between the windshield 700 and the ground surface may differ depending on the type of vehicle, the first light shield 310 preferably has a configuration corresponding to the type of vehicle.

The first light shield 310 may be fixed in a state of contact with the windshield 700.

The second light shield 320 may be disposed in front of the second lens 121a included in the second image capture module 120. The second light shield 320 prevents light reflected from the inside the windshield 700 after passing through the windshield 700 and light generated from an unwanted external light source from entering the second lens 121a. The second light shield 320 is configured to have a partition shape to block unwanted light. Particularly, considering that the stereo camera 100 is attached to the windshield 700, a lower partition is preferably provided so as to reflect light reflected from the inside the windshield 700.

The second light shield 320 may have a shape varying in accordance with the type of vehicle. For example, since a radius of curvature of the windshield 700 or an angle defined between the windshield 700 and the ground surface may differ depending on the type of vehicle, the second light shield 320 preferably has a configuration corresponding to the type of vehicle.

The second light shield 320 may be fixed in a state of contact with the windshield 700.

The first radiating member 410 may be disposed at a rear end of the first image sensor board 113. The first radiating member 410 contacts the first image sensor board 113 to dissipate heat generated from the first image sensor board 113. As described above, the first image sensor 114 included in the first image sensor board 113 is susceptible to heat. The first radiating member 410 is disposed between the first image sensor board 113 and the second housing 500 to contact the first image sensor board 113 and the second housing 500 so as to dissipate heat through the second housing 500. The first radiating member 410 may be one of a thermal pad and thermal grease.

The second radiating member 420 may be disposed at a rear end of the second image sensor board 123. The second radiating member 420 contacts the second image sensor board 123 to dissipate heat generated from the second image sensor board 123. As described above, the second image sensor 124 included in the second image sensor board 123 is susceptible to heat. The second radiating member 420 is disposed between the second image sensor board 123 and the second housing 500 to contact the second image sensor board 123 and the second housing 500 so as to dissipate heat through the second housing 500. The second radiating member 420 may be one of a thermal pad and thermal grease.

In some embodiments, the stereo camera 100 may further include first and second insulation members (not shown). The first insulation member (not shown) may be disposed between the processor board 200 and the first image sensor 114. The first insulation member (not shown) may prevent heat generated from the processor board 200 from being transferred to the first image sensor 114. The second insulation member (not shown) may be disposed between the processor board 200 and the second image sensor 124. The second insulation member (not shown) may prevent heat generated from the processor board 200 from being transferred to the second image sensor 124.

The first housing 450 may be configured to surround the first image sensor board 113 including the first image sensor 114 and the second image sensor board 123 including the second image sensor 124. The first housing 450 includes the first hole 451 and the second hole 452. The first lens module 111 may be fitted in the first hole 451 and then may be connected to the first image sensor board 113. The second lens module 121 may be fitted in the second hole 452 and then may be connected to the second image sensor board 123.

The first housing 450 may be configured to have a thickness that gradually increases toward the points corresponding to the first and second image sensors 114 and 124. For example, the first housing 450 may be produced through a die casting process. In this case, in order to prevent performance deterioration of the first and second image sensors 114 and 124 caused by heat, the first housing 450 may have a greater thickness at regions close to the points corresponding to the first and second image sensors 114 and 124 than other regions.

The first housing 450 may have a greater thickness than that of the second housing 500. In other words, the second housing 500 may have a smaller thickness than that of the first housing 450. As a thickness of the housing increases, a heat transfer rate is lowered. Accordingly, when the first housing 450 has a greater thickness than that of the second housing 500, heat generated from the interior of the stereo camera 100 may be efficiently dissipated through the second housing 500 rather than the first housing 450. This is because the first housing 450 is disposed close to the windshield and is thus difficult to dissipate heat.

The second housing 500 is configured to surround the processor board 200. The second housing 500 is positioned at a rear or lower end of the processor board 200. The second housing 500 may be made of a thermally conductive material. For example, the second housing 500 may be made of a metal such as aluminum. Since the second housing 500 is made of a thermally conductive material, efficient heat dissipation may be realized.

When the second housing 500 is made of aluminum, components disposed in the housing (for example, the first and second image sensor boards 113 and 123 or the processor board 200) may be advantageously protected from electromagnetic interference (EMI) and electrostatic discharge (ESC).

The second housing 500 may contact the processor board 200. Therefore, heat may be efficiently transferred and dissipated to the outside through the contact portion.

The second housing 500 may further include the radiating unit 550. The radiating unit 550 may include at least one of a heat sink, cooling fins, a thermal pad and thermal grease. The radiating unit 550 dissipates heat generated from the interior of the stereo camera 100 to the outside. For example, the radiating unit 550 may be positioned between the processor board 200 and the second housing 500 so as to contact the processor board 200 and the second housing 500, thus allowing heat generated from the processor board 200 to be dissipated to the outside.

A module that includes the first image capture module 110, the second image capture module 120, the first radiating member 410, the second radiating member 420, the first housing 450 and the second housing 500 may be referred to as the base assembly 20.

The holder 40 includes a space in which the base assembly 20 is mounted. The base assembly 20 is received in the space, and then the base assembly 20 is coupled to the holder 40 by a predetermined fastening element. The holder 40, to which the base assembly 20 has been coupled, may be coupled to the windshield bracket 30. Here, the base assembly 20 may be securely coupled to the holder 40 in the state of being disposed perpendicular to a direction of travel of the vehicle 10.

In some embodiments, the processor board 200 may be accommodated in the holder 40. At this time, the processor board 200 may be disposed such that a front or back surface of the processor board 200 faces the windshield 700. For example, the processor board 200 may be disposed parallel to the windshield 700.

The windshield bracket 30, the base assembly 20 and the holder 20 will be described in detail with reference to FIGS. 6 to 10.

Figure 6A:
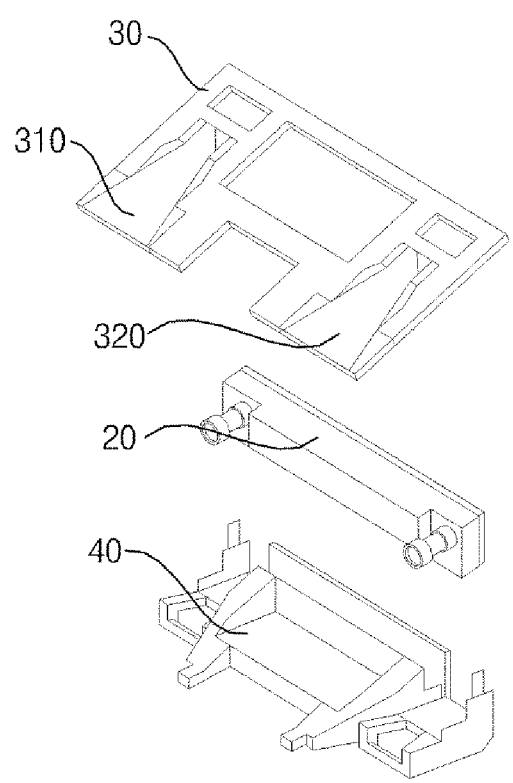
FIGS. 6(*a*) and 6(*b*) are exploded perspective views illustrating the stereo camera and a base assembly according to the embodiment of the present invention.
Figure 6B:
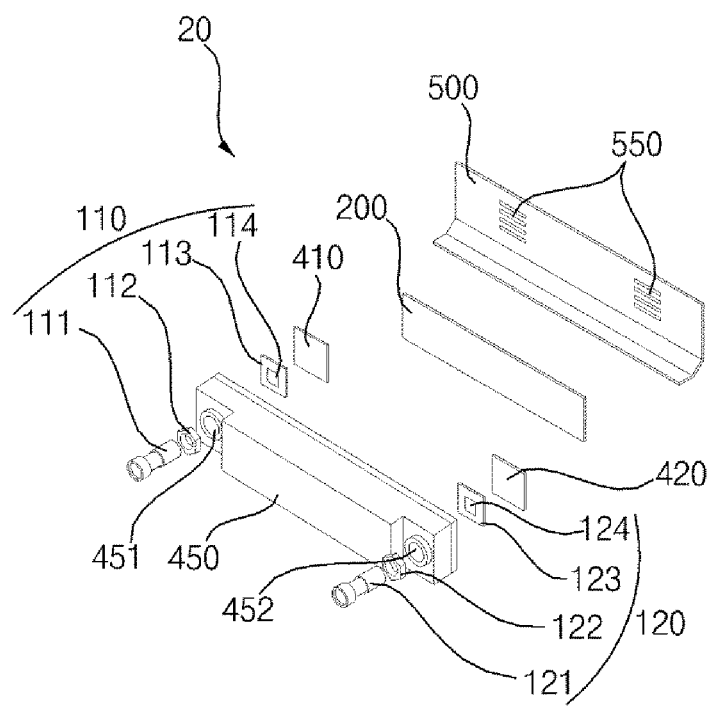
Figure 7:
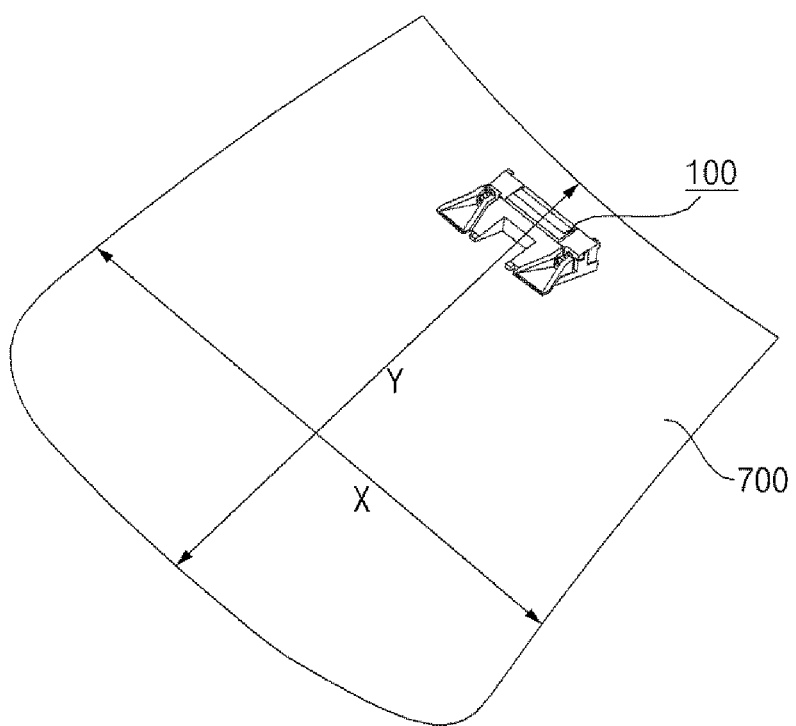
FIG. 7 is a schematic view illustrating the stereo camera attached to a windshield, according to the embodiment of the present invention.

FIGS. 6(a) and 6(b) are exploded perspective views illustrating the stereo camera and the base assembly according to the embodiment of the present invention. FIG. 7 is a schematic view illustrating the stereo camera attached to a windshield, according to the embodiment of the present invention.

As illustrated in FIG. 6(a), the stereo camera 100 may include the windshield bracket 30, the base assembly 20, and the holder 40.

As illustrated in FIG. 7, the stereo camera 100 may be mounted on the windshield 700. For example, the windshield bracket 30 may be disposed between the windshield 700 and the holder 40 including the base assembly 20 coupled thereto. The windshield bracket 30 may be attached to the windshield 700 by an adhesive member. The windshield bracket 30 includes a plurality of grooves or protrusions, and the holder 40 including the base assembly 20 coupled thereto may include protrusions or grooves corresponding to the plurality of grooves or the protrusions formed at the windshield bracket 30. The stereo camera 100 may be mounted on the windshield 700 by fitting the plurality of protrusions or grooves provided at the holder 40 into the grooves or protrusions provided at the windshield bracket 30.

As previously described with reference to FIG. 3, the windshield 700 has an inclination angle and a radius of curvature which differ depending on the type of vehicle. The stereo camera 100 should be designed in consideration of an inclination angle and a radius of curvature of the windshield 700. The windshield bracket 30 may have the same inclination angle and radius of curvature as those of the windshield 700 which differ depending on the type of vehicle. Generally, the windshield has a radius of curvature in the horizontal direction (X direction) or in the vertical direction (Y direction). The windshield 700 may have a radius of curvature in order to take a streamlined shape capable of reducing wind resistance. The horizontal radius of curvature may refer to a radius of curvature when the windshield 700 extends from the left side to the right side. The vertical radius of curvature may refer to a radius of curvature when the windshield 700 extends from the upper side to the lower side.

For example, when the vehicle 10 is an SUV or RV, the windshield bracket 30 may have a shape corresponding to an inclination angle and a radius of curvature of a windshield provided in the SUV or the RV. In another example, when the vehicle 10 is a sedan, the windshield bracket 30 may have a shape corresponding to an inclination angle and a radius of curvature of a windshield provided in the sedan. In a further example, when the vehicle 10 is a sports car, the windshield bracket 30 may have a shape corresponding to an inclination angle and a radius of curvature of a windshield provided in the sports car.

As illustrated in FIG. 6(b), the base assembly 20 includes the first image capture module 110, the second image capture module 120, the processor board 200, the first radiating member 410, the second radiating member 420, the first housing 450, and the second housing 500.

The first image capture module 110 includes the first lens module 111 and the first image capture sensor board 113. The first lens module 111 may be fitted in the first hole 451 formed at the first housing 450 and then may be fastened thereto by the first nut 112.

The first lens module 111 may include the first lens 111a. The first image sensor 114 obtains a first image on the basis of incident light introduced through the first lens 111a.

The first image sensor board 113 including the first image sensor 114 may be disposed at a rear end of the first lens module 111 so as to receive an image from the first lens module 111. The first image sensor board 113 is preferably disposed perpendicular to the direction of travel of the vehicle 10 while being spaced apart from the first lens module 111 by a predetermined spacing distance.

The second image capture module 120 includes the second lens module 121 and the second image sensor board 123. The second lens module 121 may be fitted in the second hole 452 formed at the first housing 450 and then may be fastened thereto by the second nut 122.

The second lens module 121 may include the second lens 121*a*. The second image sensor 124 obtains a second image on the basis of incident light introduced through the second lens 121*a*.

The second image sensor board 123 including the second image sensor 124 may be disposed at a rear end of the second lens module 121 so as to receive an image from the second lens module 121. The second image sensor board 123 is preferably disposed perpendicular to the direction of travel of the vehicle 10 while being spaced apart from the second lens module 121 by a predetermined spacing distance.

The processor board 200 may be disposed at rear ends of the first and second image sensor boards 113 and 123. The processor board 200 may be disposed at rear ends of the first and second image sensors 114 and 124. The processor board 200 may be disposed perpendicular to the direction of travel of the vehicle 10. Since the processor board 200 is disposed perpendicular to the direction of travel of the vehicle 10, the base assembly 20 may be configured to have a relatively small size.

The first radiating member 410 may be disposed at a rear end of the first image sensor board 113. The first radiating member 410 contacts the first image sensor board 113 to dissipate heat generated from the first image sensor board 113.

The second radiating member 420 may be disposed at a rear end of the second image sensor board 123. The second radiating member 420 contacts the second image sensor board 123 to dissipate heat generated from the second image sensor board 123.

As previously described, the first housing 450 may be configured to surround the first image sensor board 113 including the first image sensor 114 and the second image sensor board 123 including the second image sensor 124. The first housing 450 includes the first hole 451 and the second hole 452. The first lens module 111 may be fitted in the first hole 451 and then may be connected to the first image sensor board 113. The second lens module 121 may be fitted in the second hole 452 and then may be connected to the second image sensor board 123.

The second housing 500 may be configured to surround the processor board 200. The second housing 500 is disposed at a rear or lower end of the processor board 200.

The stereo camera 100 may further include the radiating unit 550. As previously described, the radiating unit 550 may include at least one of a heat sink, a radiating fin, a thermal pad and thermal grease. The radiating unit 550 dissipates heat generated from the interior of the stereo camera 100 to the outside. For example, the radiating unit 550 may be disposed between the processor board 200 and the second housing 500 to contact both the processor board 200 and the second housing 500, thus enabling heat generated from the processor board 200 to be dissipated to the outside.

The base assembly 20 may be commonly used regardless of the type of vehicle. As described above, the base assembly 20, which has been coupled to the holder 40, may be coupled to the windshield bracket 30 having a shape differing depending on the type of vehicle. Since the base assembly 20 may be commonly used regardless of the type of vehicle, it is not necessary to manufacture all the stereo cameras 100 corresponding to different types of vehicles.

The holder 40 includes a predetermined space in which the base assembly 20 is mounted. After the base assembly 20 is partially accommodated in the space, the base assembly 20 and the holder 40 are coupled to each other by a predetermined fastening element. At this time, the base assembly 20 may be vertically coupled to the holder 40 in order for the first and second image capture modules 110 and 120 to capture forward images of the vehicle.

The holder 40 may be commonly used regardless of the type of vehicle. In contrast, the holder 40 may have a shape that differs depending on the type of vehicle.

FIGS. 8 to 11 are views illustrating commoditization of various modules according to embodiments of the present invention.

Figure 8:
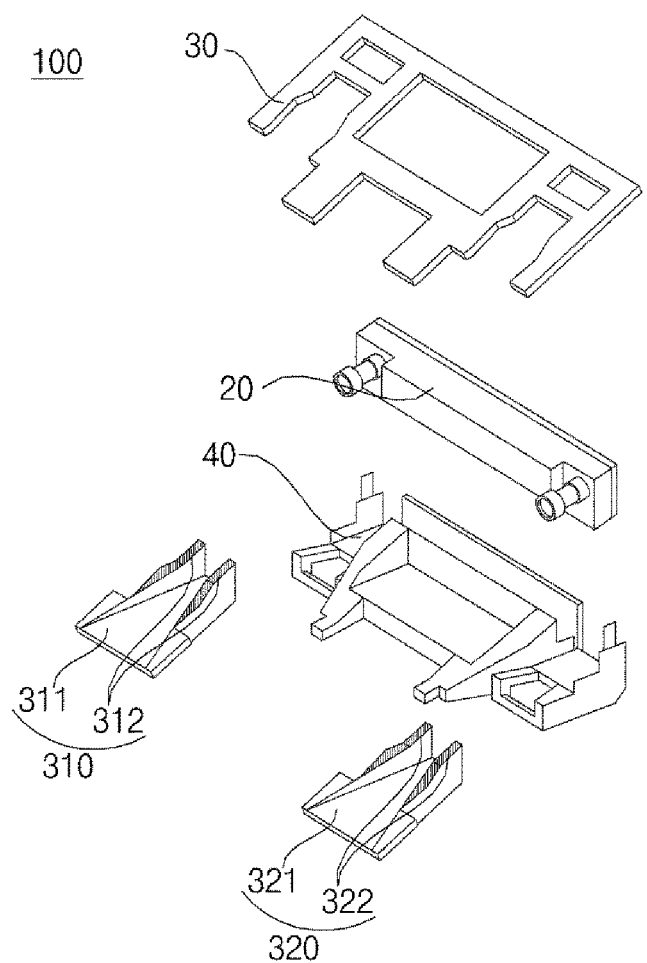
FIGS. 8 to 11 are views illustrating commoditization of various modules according to embodiments of the present invention.

FIG. 8 illustrates a stereo camera 100 according to a first embodiment of the present invention.

Referring to FIG. 8, the stereo camera 100 may include the windshield bracket 30, the base assembly 20, the holder 40, the first light shield 310, and the second light shield 320.

The windshield bracket 30, the base assembly 20, the holder 40, the first light shield 310, and the second light shield 320 included in the stereo camera 100 according to the first embodiment of the present invention have the same configurations as corresponding ones described with reference to FIGS. 4 to 7.

Features and differences of this embodiment will now be mainly described.

As described above, the windshield bracket 30 may have a shape that differs depending on the type of vehicle. More specifically, through developments corresponding to the types of vehicles, the windshield bracket 30 may have a shape corresponding to an inclination angle and a radius of curvature of the windshield 700 provided in each type of vehicle.

The base assembly 20 may be commonly used regardless of the type of vehicle.

The holder 40 may be commonly used regardless of the type of vehicle. The holder 40 may include attachment portions so as to enable the first and second light shields 310 and 320 to be attached to the holder 40.

The first and second light shields 310 and 320 may be configured in a detachable manner. In other words, the first and second light shields 310 and 320 are attached to the windshield 700. Each of the first and second light shields 310 and 320 may have a shape corresponding to an inclination angle and a radius of curvature of the windshield 700 of the target vehicle.

For example, the light shield 310 may include a first shield portion 311 and a first light shield attachment portion 312. The first shield portion 311 functions to prevent light out of the field of view from entering the first lens or to control an amount of incident light. The first light shield attachment portion 312 may be attached to an inner surface of the windshield 700 by an adhesive member. The first light shield attachment portion 312 may securely fix the first light shield 310 to the windshield 700. The first light shield attachment portion 312 may be commonly used regardless of the type of vehicle. Specifically, the first light shield attachment portion 312 may be configured to be attached to any of the various windshields 701, 702 and 703 (FIG. 3) having different inclination angles and radii of curvature. For example, the first light shield attachment portion 312 may be made of flexible material, and thus may be flexibly adapted to an inclination angle or a radius of curvature of the windshield 700 of the vehicle and attached thereto.

For example, the second light shield 320 may include a second shield portion 321 and a second light shield attachment portion 322. The second shield portion 321 functions to prevent light out of the field of view from entering the second lens or to control an amount of incident light. The second light shield attachment portion 322 may be attached to an inner surface of the windshield 700 by an adhesive member. The second light shield attachment portion 322 may securely fix the second light shield 320 to the windshield 700. The second light shield attachment portion 322 may be commonly used regardless of the type of vehicle. Specifically, the second light shield attachment portion 322 may be configured to be attached to any of the various windshields 701, 702 and 703 (FIG. 3) having different inclination angles and radii of curvature. For example, the second light shield attachment portion 322 may be made of flexible material, and thus may be flexibly adapted to an inclination angle or a radius of curvature of the windshield 700 of the vehicle and attached thereto.

The first and second light shields 310 and 320 may be attached to the attachment portion of the holder 40.

Figure 9:
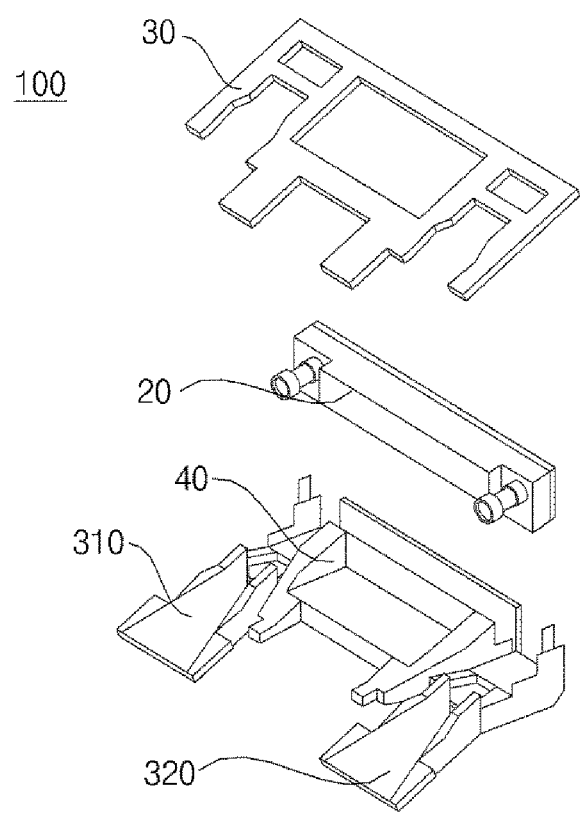

FIG. 9 illustrates a stereo camera 100 according to a second embodiment of the present invention.

Referring to FIG. 9, the stereo camera 100 may include the windshield bracket 30, the base assembly 20, and the holder 40.

The windshield bracket 30, the base assembly 20, the holder 40, the first light shield 310, and the second light shield 320 included in the stereo camera 100 according to the second embodiment of the present invention have the same configurations as corresponding ones described with reference to FIGS. 4 to 7.

Features and differences of this embodiment will now be mainly described.

As described above, the windshield bracket 30 may have shape that differs depending on the type of vehicle. More specifically, through developments corresponding to the types of vehicles, the windshield bracket 30 may have a shape corresponding to an inclination angle and a radius of curvature of the windshield 700 provided in each type of vehicle.

The base assembly 20 may be commonly used regardless of the type of vehicle.

The holder 40 may be integrated with the first and second light shields 310 and 320. The first and second light shields 310 and 320 are attached to the windshield 700. Here, through developments corresponding to the types of vehicles, the holder 40 integrated with the first and second light shields 310 and 320 may have a shape corresponding to an inclination angle and a radius of curvature of the windshield 700 provided in each type of vehicle.

Figure 10:
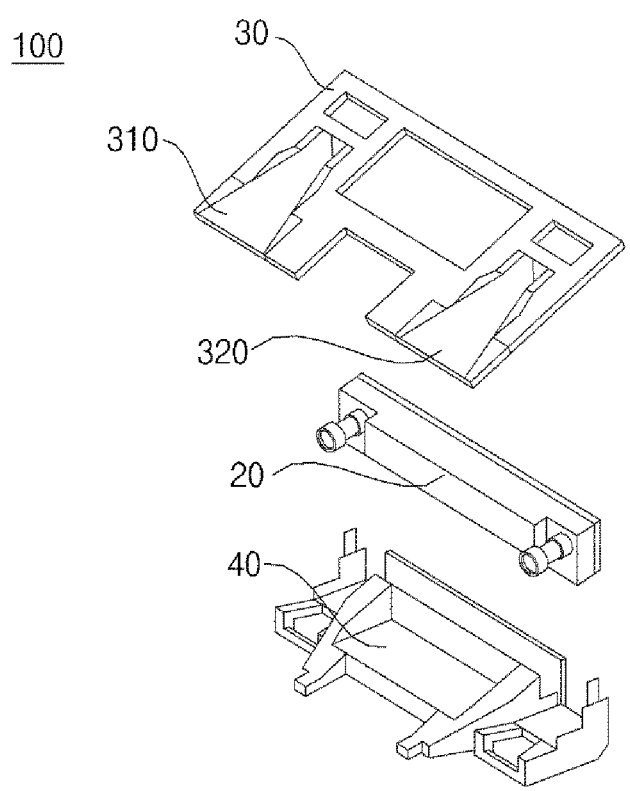

FIG. 10 illustrates a stereo camera 100 according to a third embodiment of the present invention.

Referring to FIG. 10, the stereo camera 100 may include the windshield bracket 30, the base assembly 20, and the holder 40.

The windshield bracket 30, the base assembly 20, the holder 40, the first light shield 310, and the second light shield 320 included in the stereo camera 100 according to the third embodiment of the present invention have the same configurations as corresponding ones described with reference to FIGS. 4 to 7.

Features and differences of this embodiment will now be mainly described.

The windshield bracket 30 may be integrated with the first and second light shields 310 and 320. The first and second light shields 310 and 320 are attached to the windshield 700. Here, through developments corresponding to the types of vehicles, the windshield bracket 30 integrated with the first and second light shields 310 and 320 may have a shape corresponding to an inclination angle and a radius of curvature of the windshield 700 provided in each type of vehicle.

The base assembly 20 may be commonly used regardless of the type of vehicle.

The holder 40 may also be commonly used regardless of the type of vehicle.

Figure 11:
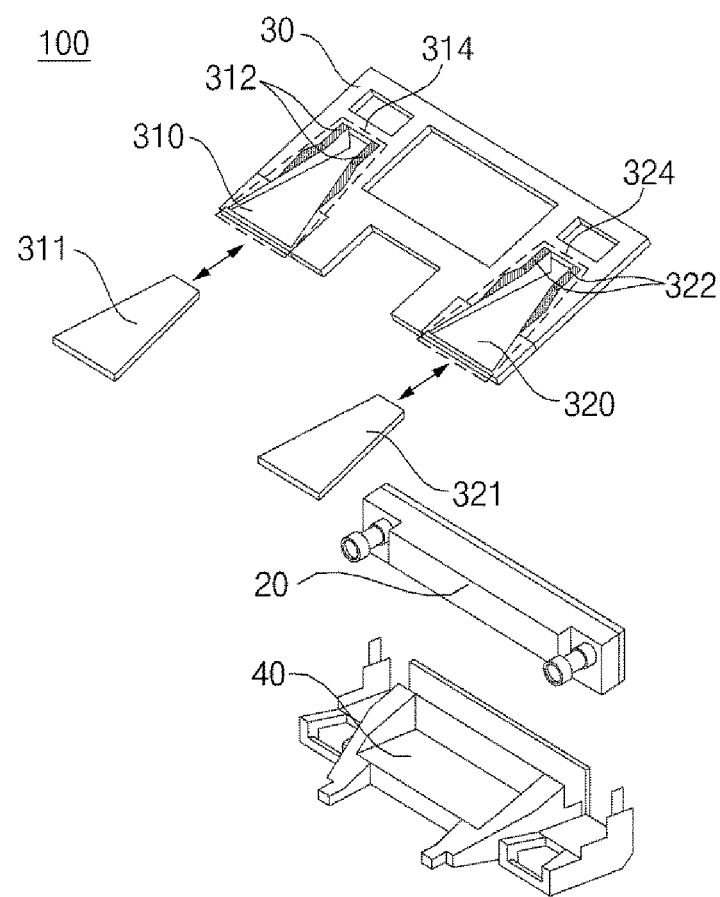

FIG. 11 illustrates a stereo camera 100 according to a fourth embodiment of the present invention.

Hereinafter, the differences between the fourth embodiment and the first to third embodiments will be mainly described.

The first shield portion 311 and the first light shield attachment portion 312 which are included in the first light shield 310 may be separately manufactured. Furthermore, the second shield portion 321 and the second light shield attachment portion 322 which are included in the second light shield 320 may be separately manufactured.

For example, the first and second light shield attachment portions 312 and 322 may be integrated with the windshield bracket 30. In this case, the first and second shield portions 311 and 312 may be configured in a removable manner. The first and second shield portions 311 and 321 may be removably coupled to the windshield bracket 30 integrated with the first and second light shield attachment portions 312 and 322.

Here, the combination of the coupled first shield portion 311 and the integrated first light shield attachment portion 312 may be referred to as a first guide portion 314. Furthermore, the combination of the coupled second shield portion 321 and the integrated second light shield attachment portion 322 may be referred to as a second guide portion 324. In other words, the first guide portion 314 to which the first shield portion 311 is coupled may be adapted to windshields of vehicle having different inclination angles and radii of curvature and may be attached thereto. Furthermore, the second guide portion 324 to which the second shield portion 321 is coupled may be adapted to windshields of vehicles having different inclination angles and radii of curvature and may be attached thereto.

Figure 12:
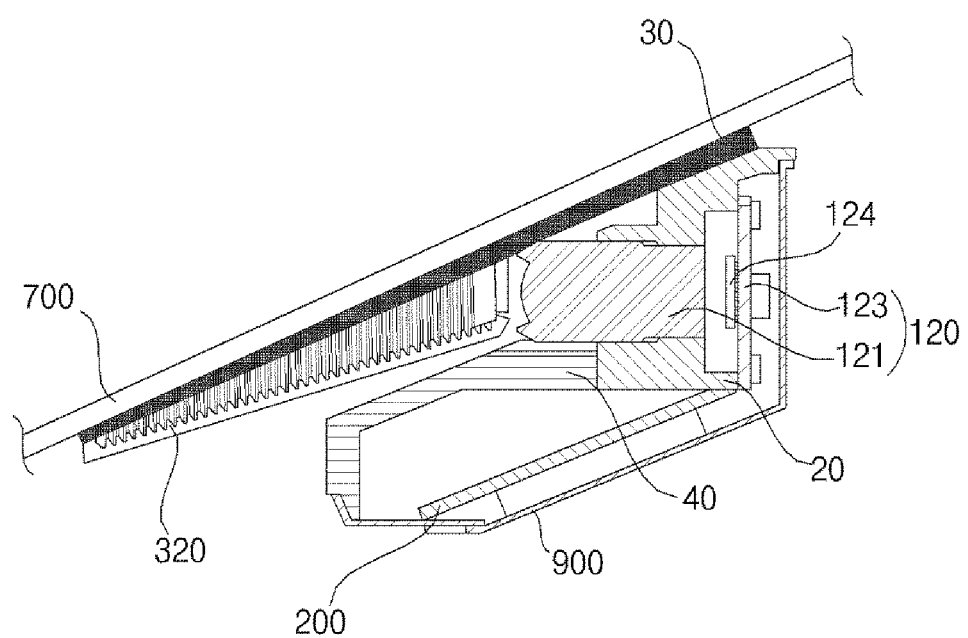
FIG. 12 is a cross-sectional view of a stereo camera according to a further embodiment of the present invention.

FIG. 12 is a cross-sectional view of a stereo camera according to a further embodiment of the present invention.

Hereinafter, the differences between this embodiment and the first to fourth embodiments will be mainly described.

The processor board 200 may not be included in the base assembly 20. More specifically, the processor board 200 may be disposed below the holder 40. The processor board 200 may be disposed below the first and second image sensors 114 and 124. The processor board 200 may be inclined with respect to a direction of travel of the vehicle. In this case, by virtue of the configuration in which a front or back surface of the processor board 200 faces the windshield 700, the stereo camera 100 may have a smaller size than when the processor board 200 is disposed vertically or horizontally. Thanks to the reduction in size of the stereo camera 100, the available space in the vehicle 10 may be enlarged by a portion corresponding to the reduced size.

The stereo camera 100 may further include a rear housing 900. The rear housing 900 is disposed below the processor board 200. The rear housing 900 may be made of a thermally conductive material. The rear housing 900 is preferably made of a metal such as aluminum. The rear housing 900 dissipates heat generated from the processor board 200 to the outside.

As specifically described above, the stereo camera according to at least one embodiment of the present invention may provide the following effects.

1) Since components capable of being commonly used regardless of the type of vehicle and components incapable of being commonly used may be separately manufactured, it is possible to manufacture the components in accordance with the type of vehicle.

2) Since all components are not manufactured in accordance with different types of vehicles, respectively, but only components incapable of being commonly used are manufactured in accordance with the different types of vehicles, manufacturing costs are reduced.

3) Heat generated from an exterior or interior of the stereo camera may be efficiently managed.

Effects of the present invention are not limited to the above disclosed effects, and other effects of the present invention which are not disclosed herein will be clearly understood from the accompanying claims by those skilled in the art.

It will be understood by those skilled in the art that the present invention is not limited to the embodiments but may be variously changed without departing from the technical idea of the present invention. Therefore, it should be understood that the embodiments disclosed in the present invention are not restrictive but are illustrative. The scope of the present invention should be interpreted by the accompanying claims rather than the above detailed description, and it is to be understood that all technical ideas within the claims fall within the purview of the present invention.

What is claimed is:

1. A stereo camera attachable to a windshield of a vehicle, the stereo camera comprising:
   a base assembly including:
   a first lens;
   a first image sensor configured to capture a first image on the basis of incident light introduced through the first lens;
   a second lens;
   a second image sensor configured to capture a second image on the basis of incident light introduced through the second lens;
   a processor configured to process the first image and the second image;
   a processor board on which the processor is mounted and being disposed rearward of the first image sensor and the second image sensor, wherein the processor board includes at least one memory configured to store images acquired by the first image sensor and the second image sensor;
   a first housing configured to hold the first lens, the second lens, the first image sensor and the second image sensor; and
   a second housing disposed rearward of the first housing;
   a windshield bracket including:
   an attachment part made of a flexible material and being attached to an inner surface of the windshield; and
   a mount part configured to hold the base assembly so as to enable the first image sensor and the second image sensor to capture forward images of the vehicle; and
   a holder that includes a space in which the base assembly is mounted, wherein the holder, to which the base assembly has been coupled, is coupled to the windshield bracket,
   wherein the first housing has a greater thickness than that of the second housing and the thickness of the first housing gradually increases toward the first image sensor and second image sensor,
   wherein the processor board is disposed between a first image sensor board containing the first image sensor and a second image sensor board containing the second image sensor,
   wherein the processor is positioned at the center of the processor board,
   wherein the at least one memory is arranged adjacent to the processor on the processor board and surrounds the processor,
   wherein the second housing comprises a radiating unit configured to dissipate heat generated from the processor board to the outside, and
   wherein the radiating unit contacts both the processor board and the second housing.

2. The stereo camera according to claim 1, wherein the processor board is disposed perpendicular to a direction of travel of the vehicle.

3. The stereo camera according to claim 1, wherein the second housing comprises a thermally conductive material.

4. The stereo camera according to claim 1, further comprising:
   a first insulation member disposed between the processor board and the first image sensor to prevent heat generated from the processor board from being transferred to the first image sensor; and
   a second insulation member disposed between the processor board and the second image sensor to prevent heat generated from the processor board from being transferred to the second image sensor.

5. The stereo camera according to claim 1, further comprising:
   a first radiating member configured to dissipate heat generated from the first image sensor to the outside of the stereo camera; and
   a second radiating member configured to dissipate heat generated from the second image sensor to the outside of the stereo camera.

6. The stereo camera according to claim 1, further comprising a rear housing disposed below the processor board, the rear housing comprising a thermally conductive material to dissipate heat generated from the processor board.

7. The stereo camera according to claim 6, wherein the processor board is disposed below the first image sensor and the second image sensor, and
   wherein the processor board is inclined with respect to a direction of travel the vehicle.

8. The stereo camera according to claim 6, further comprising:
   a first insulation member disposed between the processor board and the first image sensor to prevent heat generated from the processor board from being transferred to the first image sensor; and
   a second insulation member disposed between the processor board and the second image sensor to prevent heat generated from the processor board from being transferred to the second image sensor.

9. The stereo camera according to claim 6, further comprising:
   a first radiating member configured to dissipate heat generated from the first image sensor to the outside; and
   a second radiating member configured to dissipate heat generated from the second image sensor to the outside.

10. The stereo camera according to claim 1, further comprising:
    a first shield portion configured to control an amount of incident light introduced into the first lens; and
    a second shield portion configured to control an amount of incident light introduced into the second lens,
    wherein the windshield bracket includes:

a first guide portion to which the first shield portion is attached; and a second guide portion to which the second shield portion is attached, wherein the first shield portion is removably coupled to the windshield bracket, and wherein the second shield portion is removably coupled to the windshield bracket.

11. The stereo camera according to claim 1, further comprising:

a first light shield attached to the holder to control an amount of incident light introduced into the first lens; and a second light shield attached to the holder to control an amount of incident light introduced into the second lens, wherein the first light shield and the second light shield each is made of a flexible material, and wherein the first light shield and the second light shield each is flexibly attached to the windshield based on the inclination angle or the radius of curvature of the windshield.

12. The stereo camera according to claim 1, wherein the base assembly mounted on the holder is perpendicular to a direction of travel of the vehicle.

13. The stereo camera according to claim 1, further comprising:

a first light shield attached to the windshield bracket to control an amount of incident light introduced into the first lens; and a second light shield attached to the windshield bracket to control an amount of incident light introduced into the second lens, wherein each of the first light shield and the second light shield is attached to the windshield bracket, wherein the first light shield and the second light shield each is made of flexible material, and wherein the first light shield and the second light shield each is flexibly attached to the windshield based on the inclination angle or the radius of curvature of the windshield.

14. The stereo camera according to claim 13, wherein the first light shield is integrally attached to the holder, and wherein the second light shield is integrally attached to the holder.

15. The stereo camera according to claim 1, wherein the windshield bracket includes a plurality of grooves or protrusions, and wherein the holder includes protrusions or grooves corresponding to the plurality of grooves or the protrusions formed at the windshield bracket.

16. The stereo camera according to claim 1, wherein the processor is located on the processor board at a first distance from the first image sensor and the processor is located on the processor board at a second distance from the second image sensor, and wherein the first distance is equal to the second distance.

17. The stereo camera according to claim 1, further comprising:

a first light shield disposed in front of the first lens to control an amount of incident light introduced into the first lens; and a second light shield disposed in front of the second lens to control an amount of incident light introduced into the second lens, wherein the first light shield comprises a first light shield attachment part which is made of flexible material so that the first light shield is flexibly attached to the windshield, wherein the second light shield comprises a second light shield attachment part which is made of flexible material so that the first light shield is flexibly attached to the windshield, wherein the holder has a first mounting portion on which the first light shield is seated and a second mounting portion on which the second light shield is seated, wherein the first mounting portion is disposed in front of the first lens and is formed so that a width of the groove in which the first light shield is seated is wider as the distance from the first lens is increased so that the first light shield is allowed to be seated within a predetermined angle, and wherein the second mounting portion is disposed in front of the second lens and is formed so that a width of the groove in which the second light shield is seated is wider as the distance from the second lens is increased so that the second light shield is allowed to be seated within a predetermined angle.

* * * * *